(12) United States Patent
Eckholm, II et al.

(10) Patent No.: US 9,169,044 B2
(45) Date of Patent: Oct. 27, 2015

(54) METHODS AND APPARATUS FOR CONTAINING HAZARDOUS MATERIAL

(71) Applicant: Firetrace USA, LLC, Scottsdale, AZ (US)

(72) Inventors: William A. Eckholm, II, Scottsdale, AZ (US); Dustin C. Moran, Glendale, AZ (US); Brian J. Cashion, Gilbert, AZ (US)

(73) Assignee: Firetrace USA, LLC, Scottsdale, AZ (US)

( * ) Notice: Subject to any disclaimer, the term of this patent is extended or adjusted under 35 U.S.C. 154(b) by 283 days.

(21) Appl. No.: 13/841,599

(22) Filed: Mar. 15, 2013

(65) Prior Publication Data

US 2013/0211173 A1    Aug. 15, 2013

Related U.S. Application Data

(63) Continuation-in-part of application No. 12/171,980, filed on Jul. 11, 2008.

(60) Provisional application No. 60/949,599, filed on Jul. 13, 2007.

(51) Int. Cl.
*A62C 31/02* (2006.01)
*B65D 25/00* (2006.01)
(Continued)

(52) U.S. Cl.
CPC .............. *B65D 25/00* (2013.01); *A62C 3/065* (2013.01); *B60K 15/03* (2013.01); *B65D 90/22* (2013.01); *F02M 37/0076* (2013.01);
(Continued)

(58) Field of Classification Search
CPC .............. A62C 2/00; A62C 3/07; A62C 3/08; A62C 3/10
USPC ..................... 169/45, 46, 54, 62, 66
See application file for complete search history.

(56) References Cited

U.S. PATENT DOCUMENTS 208,374 A    9/1878   Connelly et al.
2,912,054 A   11/1959  Mathisen
(Continued)

FOREIGN PATENT DOCUMENTS

FR    635827    3/1928
GB    1380420   1/1975
(Continued)

OTHER PUBLICATIONS

Friedman, Raymond, "Principles of Fire Protection Chemistry Second Edition," pp. 82-86, Table 6.5 and Figure 6.11, and p. 85, Jones and Bartlett Learning, 2008.
(Continued)

*Primary Examiner* — Davis Hwu
(74) *Attorney, Agent, or Firm* — The Noblitt Group, PLLC

(57) ABSTRACT

Methods and apparatus for containing a hazardous material according to various aspects of the present invention operate in conjunction with a container having two compartments. The first compartment is configured to contain the hazardous material within a non-rigid bladder and the second compartment contains a hazard control material within a two-piece container configured to enclose the first compartment. The container may further comprise a wall separating the first compartment from the second compartment that is configured to open upon occurrence of a trigger event to release the hazard control material.

19 Claims, 7 Drawing Sheets

Figure 1A:
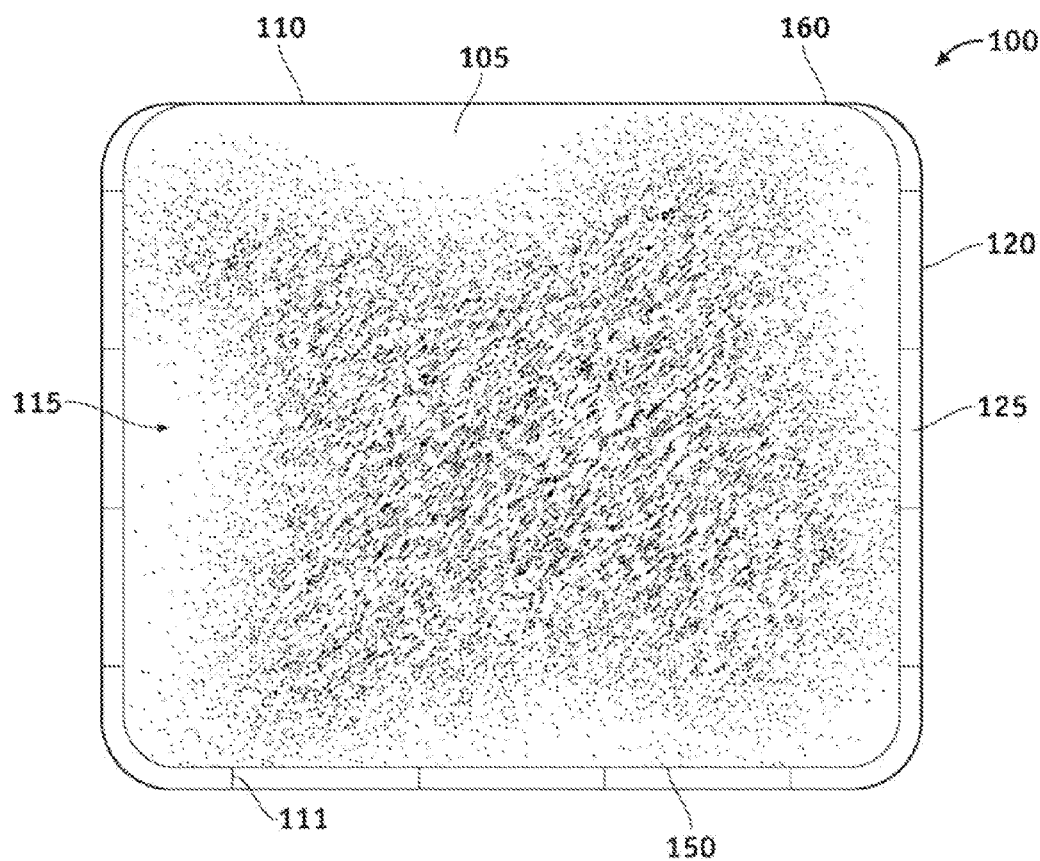

(51) Int. Cl.
| | |
|---|---|
| *A62C 3/06* | (2006.01) |
| *B65D 90/22* | (2006.01) |
| *F42B 39/14* | (2006.01) |
| *F42B 39/20* | (2006.01) |
| *F42D 5/045* | (2006.01) |
| *F02M 37/00* | (2006.01) |
| *F42B 39/16* | (2006.01) |
| *B60K 15/03* | (2006.01) |

(52) U.S. Cl.
CPC .............. *F42B 39/14* (2013.01); *F42B 39/16* (2013.01); *F42B 39/20* (2013.01); *F42D 5/045* (2013.01); *B60K 2015/03059* (2013.01); *B60K 2015/03381* (2013.01); *B60K 2015/03407* (2013.01)

(56) References Cited

U.S. PATENT DOCUMENTS

| | | |
|---|---|---|
| 3,322,294 A | 5/1967 | Nemeth |
| T861,043 I4 | 4/1969 | Gross et al. |
| 3,698,597 A | 10/1972 | Burke |
| 3,747,800 A | 7/1973 | Viland |
| 3,764,035 A | 10/1973 | Silverman |
| 3,804,292 A | 4/1974 | Chiti |
| 3,835,930 A | 9/1974 | Denigan, Jr. et al. |
| 3,930,541 A | 1/1976 | Bowman et al. |
| 4,013,190 A | 3/1977 | Wiggins et al. |
| 4,121,666 A | 10/1978 | Rozniecki |
| 4,132,271 A | 1/1979 | Mikaila |
| 4,194,979 A | 3/1980 | Gottschall |
| 4,215,752 A | 8/1980 | Waller |
| 4,251,579 A | 2/1981 | Lee et al. |
| 4,262,749 A | 4/1981 | Monte |
| 4,569,399 A | 2/1986 | Spector et al. |
| 4,652,383 A | 3/1987 | Tarpley, Jr. et al. |
| 4,784,354 A * | 11/1988 | Tavano .................... 244/135 B |
| 4,950,410 A | 8/1990 | Pennartz |
| 5,053,147 A | 10/1991 | Kaylor |
| 5,091,097 A | 2/1992 | Pennartz |
| 5,132,030 A | 7/1992 | Marx |
| 5,240,788 A | 8/1993 | Eales |
| 5,275,243 A | 1/1994 | Williams et al. |
| 5,304,313 A | 4/1994 | Berger |
| 5,390,580 A | 2/1995 | Gibbons, Jr. et al. |
| 5,393,437 A | 2/1995 | Bower |
| 5,588,493 A | 12/1996 | Spector et al. |
| 5,609,210 A | 3/1997 | Galbraith et al. |
| 5,762,145 A | 6/1998 | Bennett |
| 5,826,664 A | 10/1998 | Richardson |
| 5,833,874 A | 11/1998 | Stewart et al. |
| 5,938,969 A | 8/1999 | Vodden Morton |
| 6,019,177 A | 2/2000 | Olander |
| 6,065,545 A | 5/2000 | Williams |
| 6,217,788 B1 | 4/2001 | Wucherer et al. |
| 6,578,639 B1 | 6/2003 | Osime et al. |
| 6,929,073 B2 | 8/2005 | Thompson |
| 6,948,567 B1 | 9/2005 | Cyphers et al. |
| 7,905,296 B2 | 3/2011 | Bennet |
| 8,439,123 B2 | 5/2013 | Bennet |
| 2004/0140105 A1 | 7/2004 | Sadr |
| 2007/0107915 A1 | 5/2007 | Bennett et al. |

FOREIGN PATENT DOCUMENTS

| | | |
|---|---|---|
| GB | 1445832 | 9/1976 |
| GB | 1453836 | 10/1976 |
| GB | 1454492 | 11/1976 |
| GB | 1454493 | 11/1976 |
| GB | 1496652 | 12/1977 |
| GB | 1547568 | 6/1979 |
| JP | 141881 | 10/1940 |
| JP | 54-10418 | 1/1979 |
| JP | 09-188145 | 7/1997 |
| JP | 2006-513008 | 4/2006 |

OTHER PUBLICATIONS

Incropera, Frank et al, "Fundamentals of Heat and Mass Transfer, 3rd Edition" Jon Wiley & Sons, Inc., 1981, pp. 695-749, fig.12-23 on p. 725.

* cited by examiner

METHODS AND APPARATUS FOR CONTAINING HAZARDOUS MATERIAL

CROSS-REFERENCES TO RELATED APPLICATIONS

This application is a Continuation-in-Part of U.S. patent application Ser. No. 12/171,980, filed on Jul. 11, 2008, which claims the benefit of U.S. Provisional Patent Application Serial No. 60/949,599, filed Jul. 13, 2007, and incorporates the disclosure of such applications by reference. To the extent that the present disclosure conflicts with any referenced application, however, the present disclosure is to be given priority.

BACKGROUND OF THE INVENTION

Flammable and otherwise hazardous materials play an important role in the everyday lives of most people. Most people encounter flammable materials, such as gasoline, engine oil, diesel fuel, and natural gas, without danger. Because the flammable materials are contained, they typically present no problem for those that are nearby.

Occasionally, the vessels used to contain hazardous material rupture and the hazardous material escapes. For instance, the fuel tank in a military vehicle may rupture when struck by a projectile, causing the fuel or associated vapor to leak out. The uncontained fuel and vapor may pose a host of dangers including combustion of the fuel, toxic fumes, adverse chemical reaction with other substances outside the container.

A variety of systems have been developed to ameliorate the problems associated with uncontained hazardous material. These systems generally include a container of hazard control material such as fire extinguishant positioned in the vicinity of the hazardous material container. The hazard control material is then applied manually or automatically to reduce the danger of the hazardous material. These hazard control systems are generally stand-alone units and/or after-market systems applied to preexisting hazardous material containers.

SUMMARY OF THE INVENTION

Methods and apparatus for containing a hazardous material according to various aspects of the present in operate in conjunction with a container having two compartments. The first compartment is configured to contain the hazardous material within a non-rigid bladder and the second compartment contains a hazard control material within a two-piece container configured to enclose the first compartment. The container may further comprise a wall separating the first compartment from the second compartment that is configured to open upon occurrence of a trigger event to release the hazard control material.

BRIEF DESCRIPTION OF THE DRAWING FIGURES

A more complete understanding of the present invention may be derived by referring to the detailed description and claims when considered in connection with the following illustrative figures, in the following figures, like reference numbers refer to similar elements and steps throughout the figures.

Figure 1B:
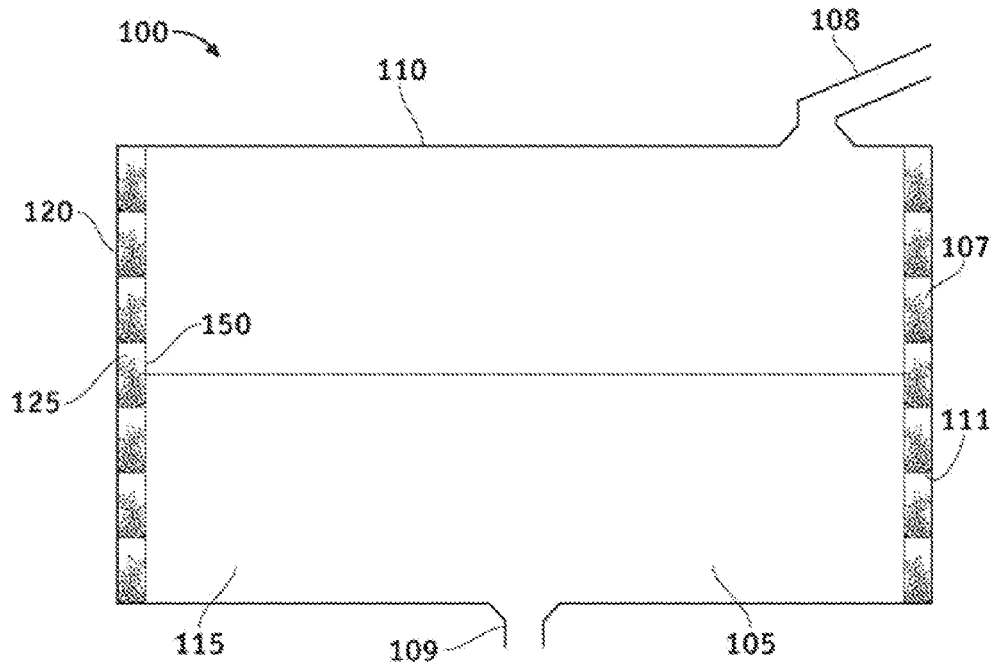
Figure 2:
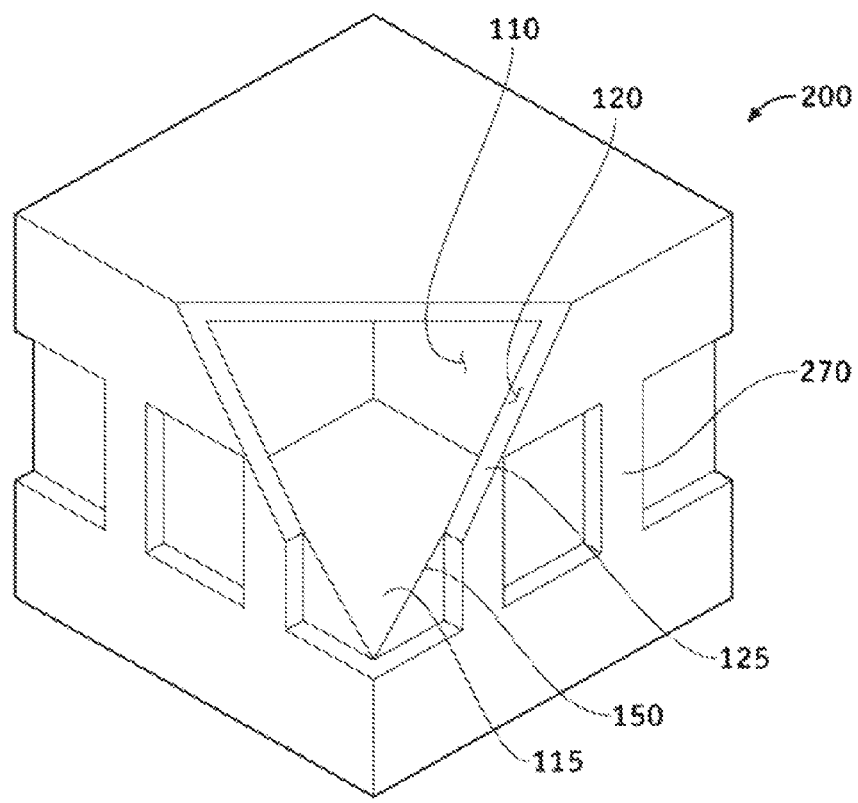
Figure 3:
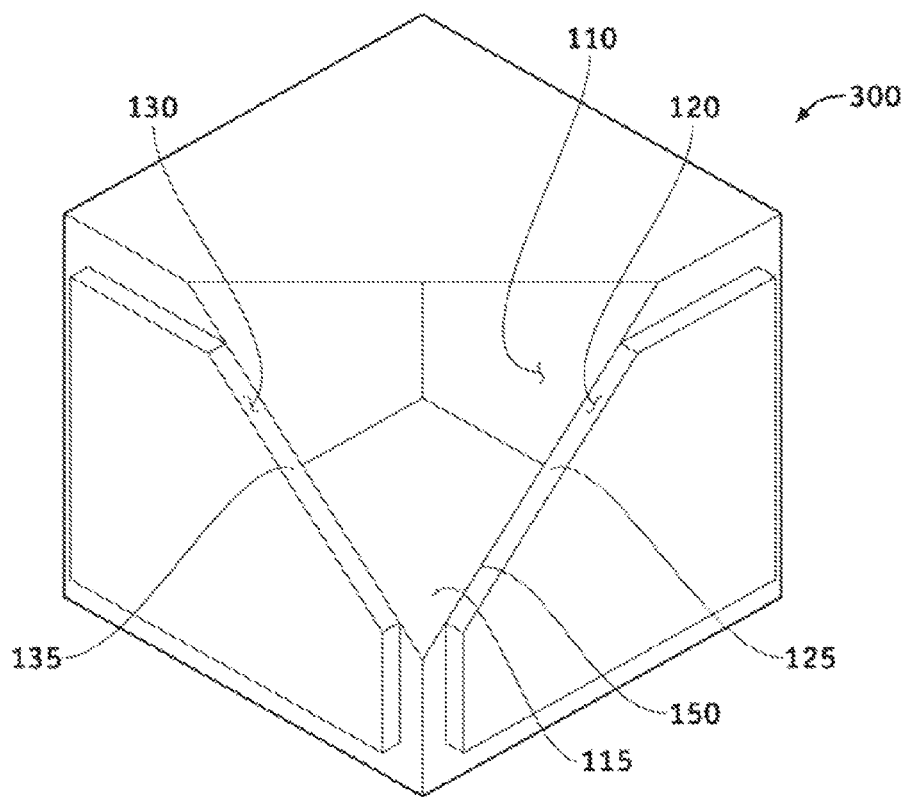
Figure 4:
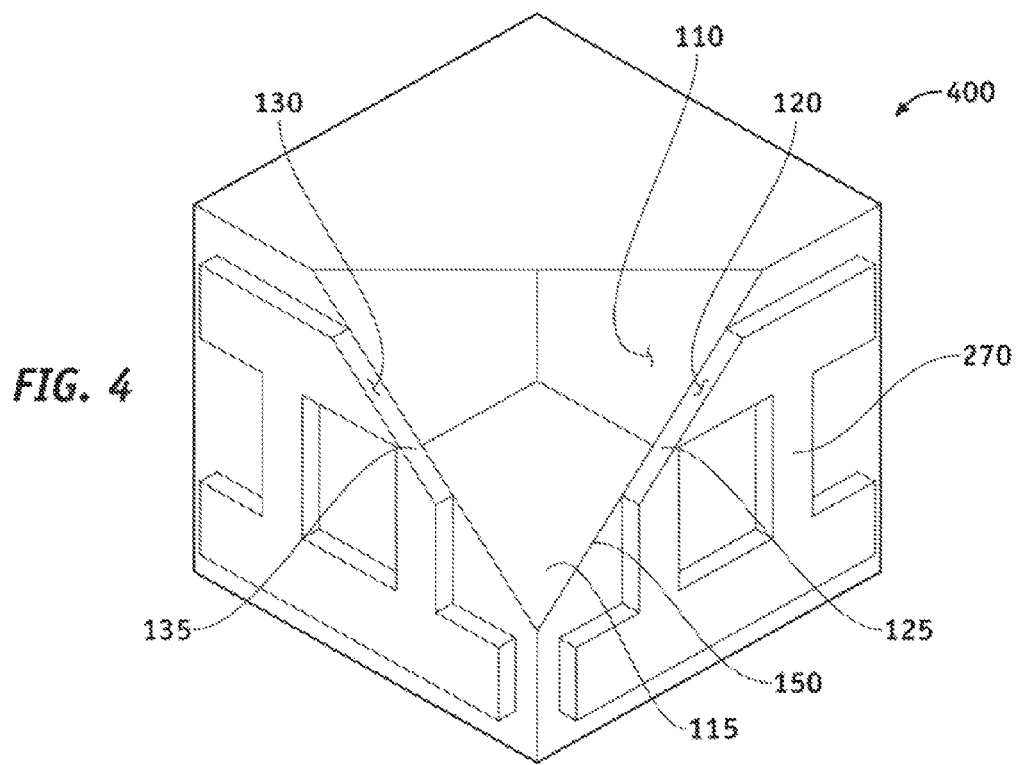
Figure 5:
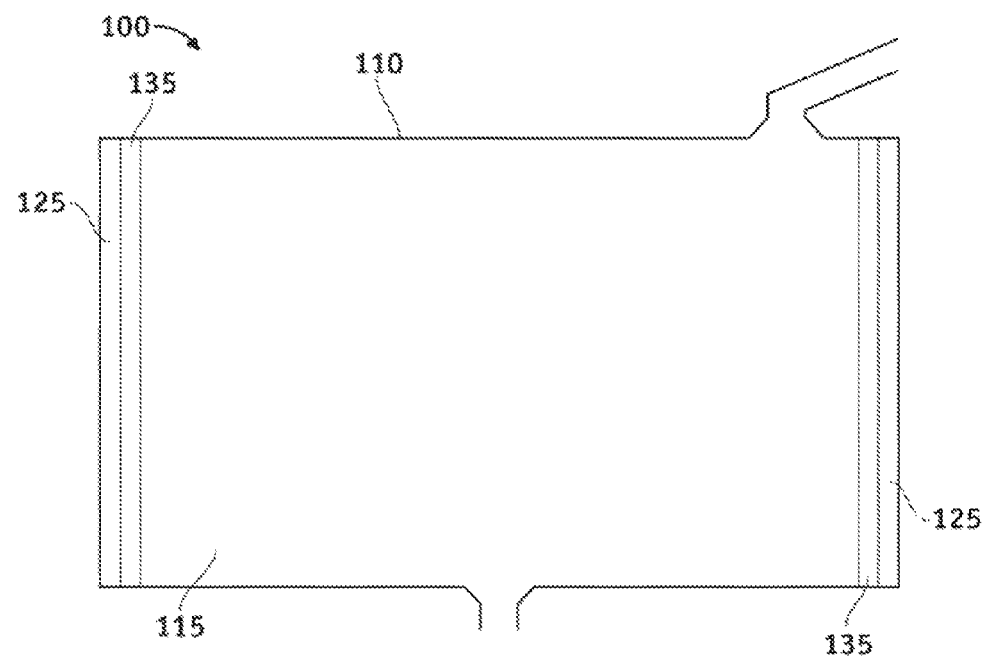
Figure 6C:
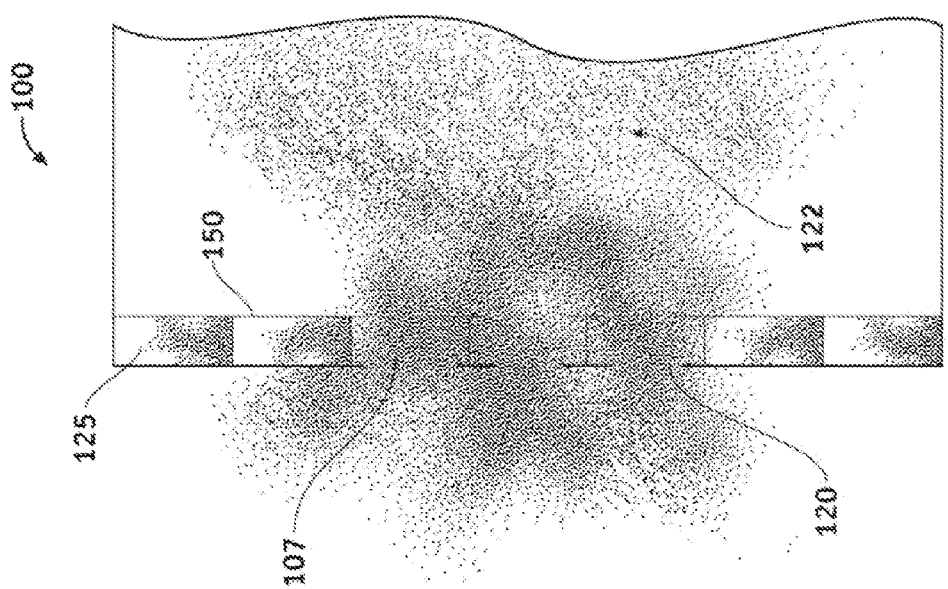
Figure 6B:
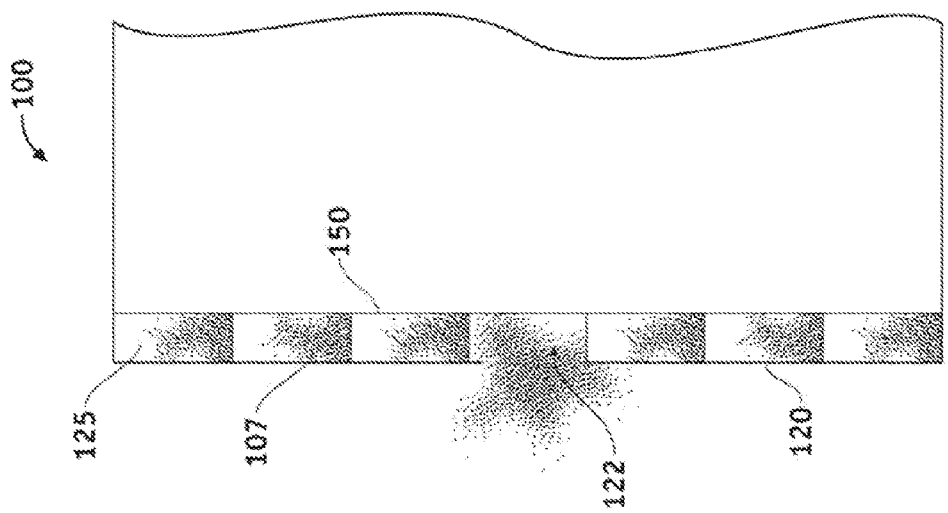
Figure 6A:
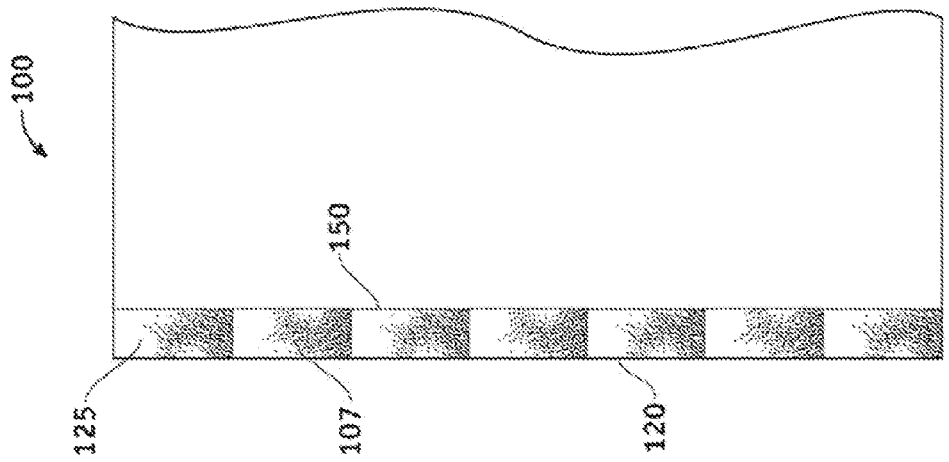
Figure 7:
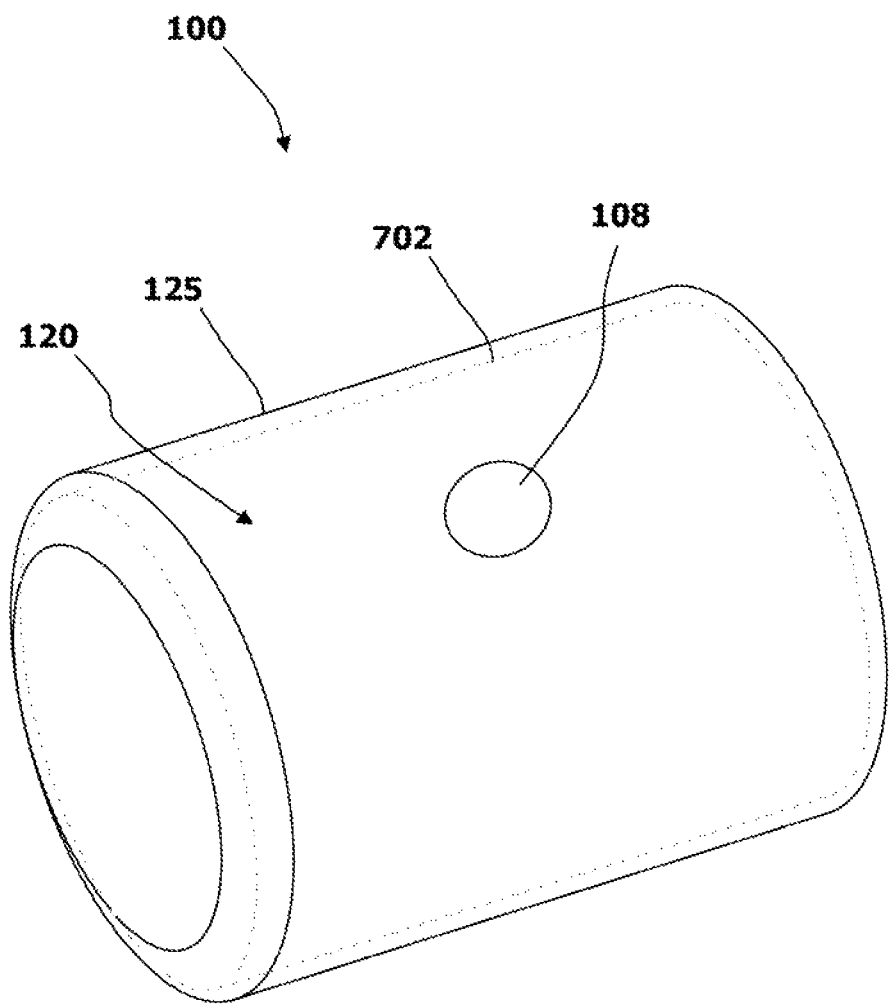
Figure 8:
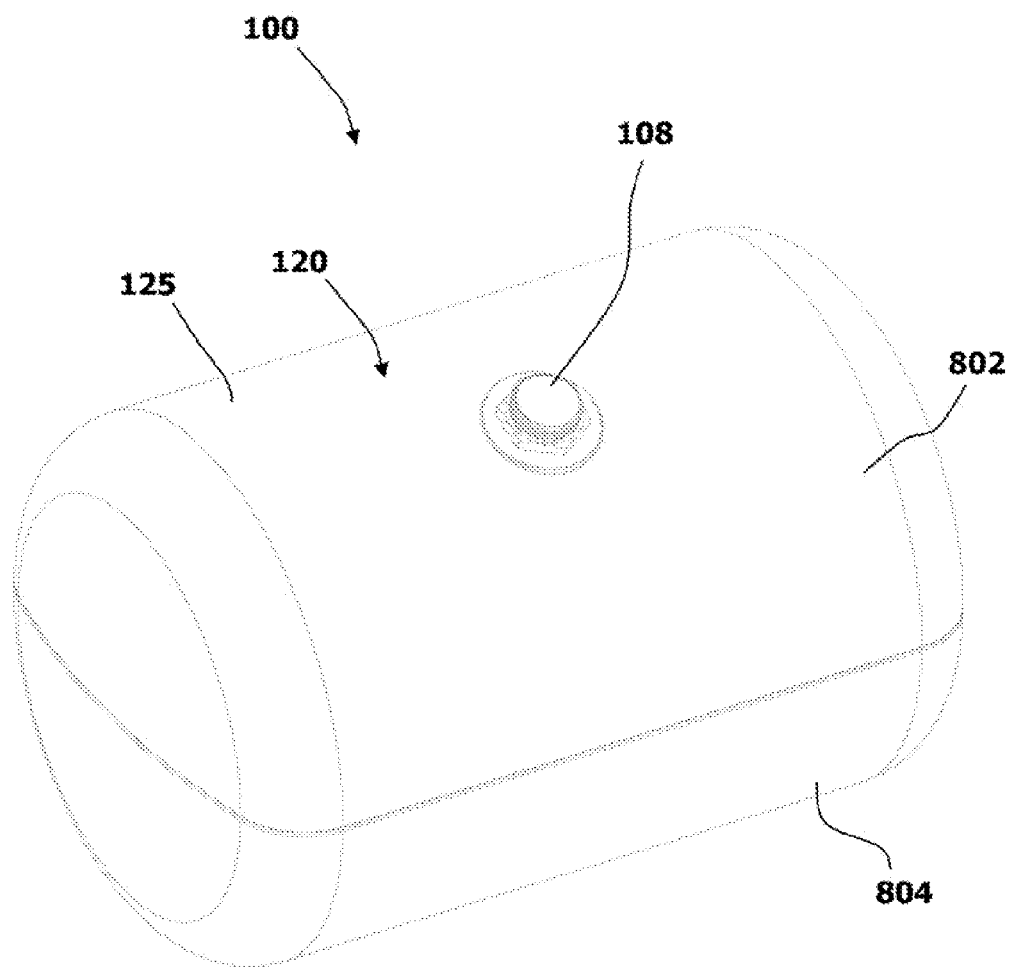
Figure 9:
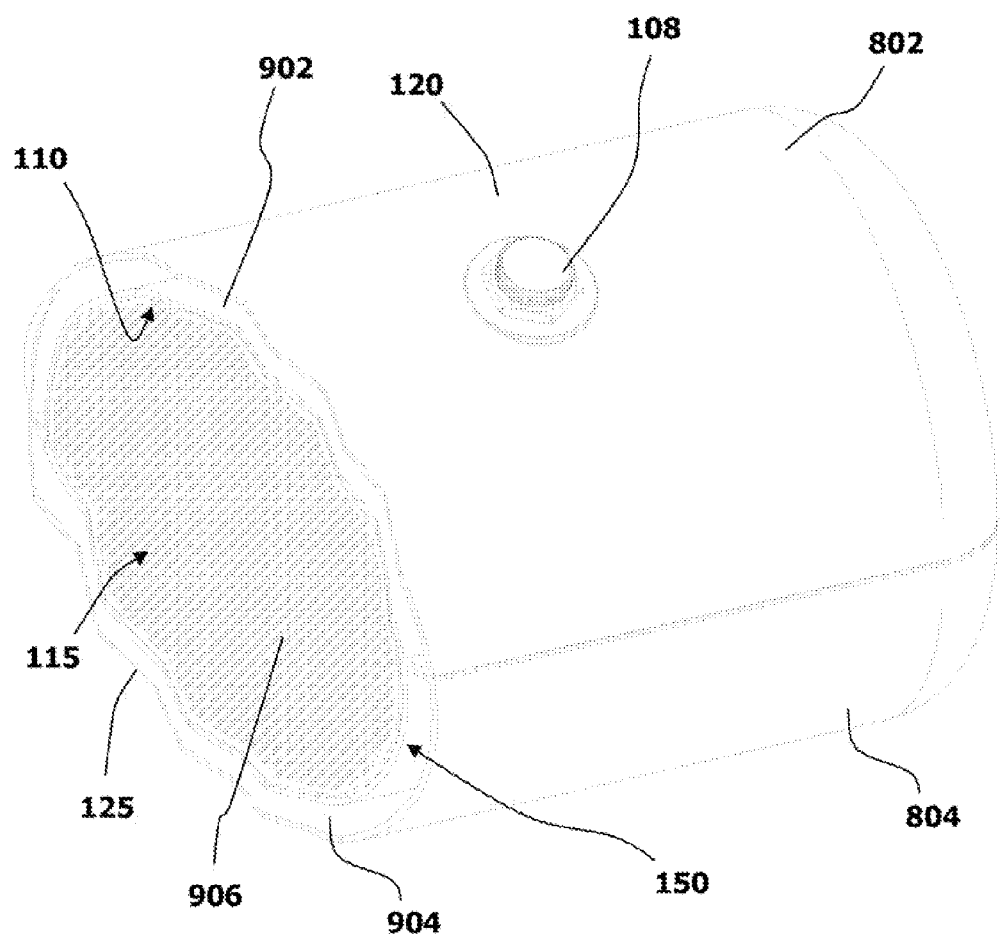

FIG. 1A-B representatively illustrates cutaway top and side views of a container according to various aspects of the present invention;

FIG. 2 representatively illustrates a cutaway orthographic view of an embodiment wherein the second compartment at least partially encloses a first compartment and wherein the second compartment includes at least one channel;

FIG. 3 representatively illustrates a cutaway orthographic view of an embodiment of the present invention wherein a second compartment and a third compartment at least partially enclose a first compartment;

FIG. 4 representatively illustrates a cutaway orthographic view of an embodiment wherein a second compartment and a third compartment at least partially enclose a first compartment and wherein the second compartment and the third compartment each include at least one channel;

FIG. 5 representatively illustrates a cross-sectional view of a container including multiple additional compartments adjacent the first compartment;

FIGS. 6A-C representatively illustrates the operation of the container in response to an incident projectile;

FIG. 7 representatively illustrates a bladder positioned within the second compartment according to various aspects of the present invention;

FIG. 8 representatively illustrates a two-piece first compartment according to various aspects of the present invention; and FIG. 9 representatively illustrates a cross-section of the container according to various aspects of the present invention.

Elements and steps in the figures are illustrated for simplicity and clarity and have not necessarily been rendered according to any particular sequence. For example, steps that may be performed concurrently or in different order are illustrated in the figures to help to improve understanding, of embodiments of the present invention.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various hazardous materials, hazard control materials, container materials, pressurizations, dimensions, and geometries, which may carry out a variety of operations suited to a specified hazard condition, application, or environment. In addition, the present invention may be practiced in conjunction with any number of systems configured for operation with the hazardous material and/or hazard control material, and the system described, is merely one exemplary application for the invention. Further, the present invention ma employ any number of conventional techniques for hazard control, hazard prevention, risk reduction, and the like.

Referring to FIGS. 1A-1B, methods and apparatus for containing a hazardous material according to various aspects of the present invention operate in conjunction with a container 100 to reduce the danger of a contained hazardous material 105. For example, referring to FIG. 1, the container 100 may contain the hazardous material 105 within a first compartment 115 and a hazard control material 107 within a second compartment 125 configured to at least substantially enclose the first compartment 115 within an interior portion of the second compartment 125. The container 100 may be configured to release the hazard control material 107 in response to a hazard condition such that the hazardous material 105 is less hazardous or rendered substantially harmless.

The container 100 may be configured in any manner to release the hazard control material 107 in response to the relevant hazard condition. For example, in one embodiment, the container 100 may comprise a first surface 110 defining at least an interior portion of the second compartment 125, a second surface 120 defining at least an exterior portion of the second compartment 125, and a wall 150 configured to lose integrity in response to a trigger event corresponding to the hazard condition. The second compartment 125 may at least partially enclose the first compartment 115. In an alternative embodiment, the wall 150 may comprise the first surface 110 of the second compartment 125 and be adapted to substantially maintain its structural integrity in response to a trigger event corresponding to the hazard condition. The container 100 may be implemented in a variety of environments, including stand-alone storage systems or fuel tanks for motor vehicles.

The container 100 may comprise a fuel tank, such that the first compartment 115 is configured to store fuel and its associated vapors, and the second compartment 125 may be configured to contain the hazard control material 107 which may comprise a fire extinguishant or fire suppressant material. The container 100 may release the extinguishant to mix with vapors or fuel in the first compartment 115 to interfere with the combustion of the vapors. If the container 100 experiences a hazard condition, such as penetration by a projectile, the wall 150 may at least partially open or otherwise allow for the release of the extinguishant to reduce the flammability of the fuel. In this way, the probability of creating a fireball in the fuel tank is reduced and the risks associated with operation of the vehicle are decreased.

The first compartment 115 may contain the hazardous material 105, which may comprise any material that may need to be neutralized or otherwise rendered less dangerous. For example, the hazardous material 105 may comprise fuel for a combustion engine, battery chemicals, solvents, brake fluid, transmission fluid, jet fuel, waste products such as radioactive and/or biological waste, and/or the like. In addition, the hazardous material 105 may be in any form, such as a liquid, vapor, solid, powder, granular, and/or other form. The hazardous material 105 may exhibit properties to be controlled, such as inflammability, chemical reactivity, toxicity, radioactivity, acidity, contagiousness, and/or the like.

In one embodiment for a vehicle fuel tank, the first compartment 115 may be configured to provide adequate volume to accommodate the fuel needs of the vehicle. Furthermore, the first compartment 115 may be shaped to fit into the fuel compartment area of the vehicle or comprise a fuel tank positioned on the exterior of the vehicle. For example, referring now to FIG. 7, in one embodiment, the first compartment 115 may comprise a bladder 702 having a substantially cylindrical shape with an interior volume for storing the hazardous material 105. In addition, the first compartment 115 may comprise any appropriate materials to accommodate the hazardous material 105 such as polymers, elastomers, and/or multi-layer composites. For example, in one embodiment, the bladder 702 may comprise a fiberglass cloth covered in a semi-rigid polyurethane material. In a second embodiment, the bladder 702 may comprise a self-sealing rubber based elastomer adapted to automatically seal punctures under a predetermined size. Further, the first compartment 115 may be lined with materials that do not react to the hazardous material 105, provide a shield around the hazardous material 105, or provide thermal and/or electrical insulation.

The first compartment 115 may also be adapted to the application and/or environment. In various embodiments, the first compartment 115 may include baffles or one or more subcompartments, which may be interconnected or isolated from each other. For example, in one embodiment a reticulated polyurethane open-cell foam 906 may be positioned within the interior volume of the bladder 702 and may act as a baffle to reduce sloshing of fuel within the bladder 702 and/or help maintain the shape of the bladder 702 when empty. For example, the bladder 702 may comprise a semi-rigid body such that it might substantially conform to the shape of the second compartment 125 when full but lack structural elements necessary to fully maintain that shape when empty. Referring to FIGS. 1B and 7, the first compartment 115 may include an inlet 108 and an outlet 109, for example to permit fuel to be added to and removed from the fuel tank. The first compartment 115 may be otherwise adapted according to the application and environment of the container 100.

The second compartment 125 contains the hazard control material 107. The second compartment 125 may be configured in any manner to contain the hazard control material 107, for example according to the environment, application, hazard control material 107, hazardous material 105, and/or other relevant factors. For example, the second compartment 125 may provide adequate volume to accommodate sufficient hazard control material 107 according to the anticipated hazard. Furthermore, the second compartment 125 may be shaped to fit into the fuel compartment area of the vehicle and to engage the outer contours of the first compartment 115. In addition, the second compartment 125 may comprise any appropriate materials to accommodate the hazard control material 107. For example, the second surface 120 at least partially defining, the second compartment 125 may comprise or be lined with materials that do not react to the hazard control material 107, provide a shield around the hazard control material 107, or provide thermal and/or electrical insulation. The first surface 110 and/or the second surface 120 may further be configured to open upon impact or other force from an external body, such as a bullet or shrapnel, or an internal body, such as a clapper, explosive, or other actuator. The puncture, opening, or other decomposition of the second surface 120 may facilitate the release of the hazard control material 107 into the surrounding environment.

In the present embodiment, the second compartment 125 is positioned adjacent the first compartment 115 and separated from the first compartment 115 by one or more surfaces, such as the wall 150 and/or the second surface 110. The second compartment 125 may comprise one or more separate subcompartments, or interconnected semi-separate subcompartments. For example, referring now to FIGS. 8 and 9, in one embodiment, the second compartment 125 may comprise a two-piece structure having, a first half 802 configured to couple to a second half 804. The first half 802 may comprise a first subcompartment 902 and the second half 804 may comprise a second subcompartment 904. In addition, the second compartment 125 and/or each subcompartment may include at least one horizontal or vertical partition 111 or other mechanism for maintaining the distribution of the hazard control material 107 within the second compartment 125 and/or each subcompartment and/or providing structural support. The second compartment 125 may include other elements, such as at least one inlet, at least one outlet, at least one point of constriction, and/or the like.

The second compartment 125 may comprise various structures and/or mechanisms configured to deploy the hazard control material 107 in response to the relevant hazard condition. For example, the partitions 111 maintain the distribution of the hazard control material 107 within the second compartment 125. In addition, referring now to FIG. 2, the second compartment 125 may comprise interconnections 270 between subcompartments, for example to facilitate transfer of the hazard control material 107 between the subcompartments, such as to initially fill the second compartment 125 with the hazard control material 107. The second compartment 125 may also include an actuator, such as electronic, pneumatic, and/or hydraulic systems, to facilitate flow of the hazard control material 107 between the subcompartments and/or deploy the hazard control material 107 in response to the relevant hazard condition. The second compartment 125 may also be pressurized to enhance dispersal of the hazard control material 107.

Alternatively, referring, again to FIGS. 8 and 9, the first subcompartment 902 and the second subcompartment 904 may be configured to maintain a volume of the hazard control material 107 independently from each other. For example, the first half 802 and the second half 804 may be configured in a clamshell arrangement such that the two halves 802, 804 couple together to form the interior portion of the second compartment 125 that is configured to but the first compartment 115. The two halves 802, 804 may be permanently or selectively coupled together by any suitable method such as mechanically or adhesively.

The hazard control material 107 comprises a material for neutralizing or otherwise reducing the hazard presented by the hazardous material 105 in the event of the hazard condition. The hazard control material 107 may comprise any appropriate material to control or reduce the effects of the hazardous material 105, such as a fire extinguishant, an acid neutralizer, or other hazard control material 107 selected according to the hazardous material 105. For example, the hazard control material 107 may comprise a fire extinguishant if the hazardous material 105 is flammable. In the present embodiment, the hazard control material 107 comprises the Black Widow® fire extinguishant available from Firetrace Aerospace, LLC. As another example, if the hazardous material 105 is chemically reactive, the hazard control material 107 may reduce or dilute the chemical reactivity of the hazardous material 105. As yet another example, if the hazardous material 105 is radioactive, the hazard control material 107 may inhibit transmission of radiation. Alternatively, if the hazardous material 105 presents a biological hazard or a toxic material, the hazard control material 107 may neutralize, reduce the threat of, create a visual marker of, or counter the biological hazard or toxicity. The properties of the hazard control material 107 may be selected according to the hazardous material 105.

The hazard control material 107 may comprise a substantially solid material such as granular material or a powder, as well as a substantially fluid material such as liquids, gases, and vapors. The hazard control material 107 may comprise a material in various phases simultaneously. In addition, the hazard control material 107 may include multiple materials to counter multiple hazardous materials 105.

The container 100 may release the hazard control material 107 in response to a particular hazard condition. The hazard condition may be represented by any appropriate trigger event, such as a change in the status of the contained hazard material 105. For example, the trigger event may include a change in temperature or pressure of the hazardous material 105 or the first compartment 115, impact by another object, sudden acceleration or deceleration, or release, leakage, or contamination of the hazardous material 105. The container 100 may detect and/or respond to the hazard condition in any appropriate manner. For example, the container 100 may include a hazard detector, such as a pressure sensor, temperature sensor, radiation sensor, chemical sensor, or the like and an actuator configured to deploy the hazard control material 107 from the second compartment 125 in response to the hazard detector. For example, the actuator may compromise the integrity of the second compartment 125 or the wall 150, open a valve on the second compartment 125, or otherwise release the hazard control material 107 from the second compartment 125.

In the present embodiment, the container 100 releases the hazard control material 107 in response to a mechanical disruption of the container 100 such that the second compartment 125 releases the hazard control material 107 when the disruption is likely to cause a release of the hazardous material 105 or otherwise cause a dangerous condition. For example, one or more surfaces defining the second compartment 125 may be configured to rip, tear, be punctured crack decompose, dissolve, or otherwise lose integrity to facilitate release of the hazard control material 107.

In one embodiment, the container 100 includes at least one wall 150 separating the first compartment 115 from the second compartment 125. The wall 150 may comprise any partition between the first compartment 115 and the second compartment 125 that loses its integrity in response to the hazard condition. In this embodiment, a portion of the wall 150 may open upon impact or other force from an external body, such as a bullet or shrapnel, or an internal body, such as a clapper, explosive, or other actuator. The opening or other decomposition of the wall 150 facilitates release of the hazard control material 107, for example into the environment surrounding the container 100, into the first compartment, or an area adjacent to the hazardous material 105. The wall 150 may open by any suitable amount such as local to the disruption or impact and create a relatively small hole in the wall 150, or may open more substantially, such as substantially completely, to release a maximum amount of hazard control material 107.

The wall 150 may be disposed in any position relative to the first compartment 115 and the second compartment 125 to facilitate deployment of the hazard control material 107. Referring again to FIG. 9, in one embodiment, the wall 150 is disposed concentrically within the second surface 120, thus defining the second compartment 125 as the space between the wall 150 and the second surface 120. The wall 150 may be contiguous so that the first compartment 115 is completely enclosed within the second compartment 125. Thus, any exterior object penetrating the first compartment 115 must first penetrate the second compartment 125 and the wall 150, causing the wall 150 to open and deploy the hazard control material 107.

Alternatively, referring now to FIGS. 1A and 1B, the wall 150 may at least partially define the first compartment 115 and one or more other surfaces, such as the first surface 110, may define the remaining portion of the first compartment 115. The wall 150 may define an unenclosed region 160 that is not enclosed by the second compartment 125. The unenclosed region 160 may be situated in a portion of the container 100 that is unlikely to be susceptible to hazard conditions. For example, it the container 100 is stacked with other systems, it may be acceptable to leave portions of the first compartment 115 unenclosed by the second compartment 125. The first surface 110 and the wall 150 may be configured to define multiple unenclosed regions 160. For example, referring to FIG. 2, the unenclosed region 160 may comprise an indentation of the second compartment 125 configured to fit the container 100 within certain other systems, such as within a vehicle. As yet another example, referring to FIG. 3, the unenclosed region 160 may be a continuous portion of the exterior of the container 100 and extend to more than one surface of the wall 150.

The wall 150 may deploy the hazard control material 107 in any appropriate manner. In one embodiment, the wall 150 may open in response to the hazard condition, such as opening relative to the size of a puncture or impact caused by a projectile. For example, the wall 150 may comprise a material, such as polyethylene, polyvinyl chloride, composite, metal, or other sufficiently rigid or semi-rigid material. The wall 150 may be configured to open such that at least a portion of the hazard control material 107 within the second compartment 125 is released in response to the hazard condition.

In a second embodiment in the wall 150 may be configured to open in manner that is larger than the size of a puncture or impact caused by a projectile. For example, the wall 150 may comprise a breakable material, such as glass, ceramic, acrylic, plastic, metal, or other sufficiently non-impervious material. The wall 150 may be configured to open such that substantially all of the contents of the second compartment 125 are released in response to the hazard condition. For example, the wall 150 may comprise stress points, such as thinner sections of the wall 150 in the form of grooves or hatching, to facilitate opening for full deployment, and/or directional deployment of the hazard control material 107. Likewise, the material of the wall 150 may exhibit a grain such that the wall 150 tends to open or separate across or along the grain.

The wall 150 may release the hazardous control material 107 in any suitable manner. In one embodiment, the wall 150 is compromised upon impact by an object, such as a bullet, shrapnel, or missile. The wall 150 may be configured to release the hazardous control material 107, however, in response to any appropriate trigger event signifying a hazard condition, such as a specified stress, pressure, or temperature in or upon the wall 150, or incidence of a particular material, such as a particular material corresponding to the hazard condition, with a portion of the wall 150. Further, the container 100 may include additional systems to facilitate breaching the wall 150. For example, the container 100 may include a control system to control the integrity of the wall 150. The control system may include any appropriate components, such as one or more sensors to detect the hazard condition, and one or more actuators, such as hydraulic actuators, pneumatic actuators, and/or solenoid valves, to compromise the integrity of or otherwise breach the wall 150 or otherwise deploy the hazard control material 107 in response to a signal from the sensor.

In another embodiment, the container 100 may further comprise a membrane positioned between the first compartment 115 and the second compartment 125. Alternatively, the membrane may be disposed solely along, an outer surface of the second compartment 125. The membrane seals small holes or punctures that might result in a small leak of the hazardous material 105 not resulting in an immediately hazardous situation. The membrane may comprise any suitable self-sealing system such as a single-piece system configured to fit between the first compartment 115 and the second compartment 125 or a coating applied to the first compartment 115 and/or the second compartment 125. The membrane may comprise any suitable material such as gel, polyurethane, rubberized asphalt, elastomeric coatings, foam and the like. For example, the membrane may comprise a self-sealing coating suitably configured to seal holes caused by small arms fire that is applied to the first compartment 115 before the second compartment 125 is position around the first compartment 115.

The container 100 may include multiple first and second compartments 115, 125. For example, referring to FIGS. 2-5, the container 100 may include one or more additional compartments 135. The compartments 115, 125, 135 may be isolated (FIG. 3) or interconnected by one or more interconnections 270 (FIGS. 2 and 4). The wall 150 may separate the additional compartments 135 from the first compartment 115. The second compartment 125 and the additional compartments 135 may fully enclose the first compartment 115, or partially enclose the first compartment 115 to form the unenclosed region 160. The additional compartments 135 may include any relevant additional features, such as inlets, outlets, subcompartments, channels, valves, points of constriction, or the like.

The additional compartments 135 may contain any appropriate material. In one embodiment, the additional compartments 135 contain the hazard control material 107. Alternatively, the additional compartments 135 may contain different hazard control materials 107 to address different hazards. In addition, the additional compartments 135 may be configured to contain more or less hazard control material 107, deploy the hazard control material 107 in a selected direction or manner, or react to a selected hazard condition, for example according to anticipated angles of attack. Further, the additional compartments 135 may deploy the hazard control material 107 in response to different hazard conditions, for example by changing the thickness or materials of the wall 150 associated with the different compartments 135.

The compartments 115, 125, 135 may be arranged in any configuration, for example to deploy multiple hazard control materials 107 or to deploy the hazard control material 107 in response to hazard conditions arriving from different incident angles. For example, referring to FIG. 5, the additional compartment 135 may be sandwiched between the first compartment 115 and the second compartment 125, such that both compartments 125, 135 are disposed between the first compartment 115 and the external environment. Alternatively, the additional compartment 135 may at least partially enclose the second compartment 125.

Referring to FIG. 6A-B, in operation, the container 100 is initially formed and the second compartment 125 is filled with the hazard control material 107. The container 100 may be installed in the appropriate environment or application, such as in a vehicle or as a stand-alone storage facility and used for its ordinary applications. In the present embodiment, the container 100 is installed as a fuel tank in a vehicle. The fuel may comprise a flammable fuel, such as conventional gasoline or jet fuel.

The container 100 responds to the trigger event corresponding to the hazard condition. The container 100 may detect and respond to the hazard event in any manner. In the present embodiment, a projectile 122 pierces the second surface 120 and passes through hazard control material 107 (FIG. 6B). The projectile 122 then strikes the wall 150, causing the wall 150 to fail, such as by puncturing. In the present embodiment, a large portion of the wall 150 breaks open, releasing the hazard control material 107 from multiple subcompartments of the second compartment 125 (FIG. 6C) both into the first compartment 115 and into the surrounding environment. The failure of the wall 150 reduces or eliminates the separation of the hazard control material 107 from the hazardous material 105.

As the projectile 122 proceeds into the first compartment 115, the projectile 122 may tend to release and/or ignite the hazardous material 105 or otherwise generate the hazardous condition. The failure of the wall 150, however, releases the hazard control material 107, which may follow the projectile 122 into the first compartment 115 and mix with the hazardous material 105. In addition, if the hazardous material 105 leaves the first compartment, the hazard control material 107 may accompany the hazardous material 105. Thus, the hazard control material 107 tends to mitigate the hazard presented by the hazardous material 105 following the trigger event.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines that may be shown in the various figures are intended to represent exemplary functional relationships and/or physical couplings between the various elements. Many alternative or additional functional relationships or physical connections may be present in a practical system. Benefits, other advantages and solutions to problems that have been described above with regard to particular embodiments are not to be construed as critical, required or essential features or components. Changes and modifications may be made to the exemplary embodiments embodiment without departing from the scope of the present invention. These and other changes or modifications are intended to be included within the scope of the present invention, as expressed in the following claims.

In the foregoing description, the invention has been described with reference to specific exemplary embodiments; however, various modifications and changes may be made without departing from the scope of the present invention. The description and figures are to be regarded in an illustrative manner rather than a restrictive one, and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

The terms "comprises", "comprising", or any variation thereof, are intended to reference a nonexclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same. . A multi-zone container, comprising:
a first compartment configured to contain a hazardous material; and
a second compartment enclosing the first compartment, wherein the second compartment comprises:
a first surface defining

We claim:

1. A multi-zone container, comprising:
a first compartment configured to contain a hazardous material; and
a second compartment enclosing the first compartment, wherein the second compartment comprises:
a first surface defining an exterior surface of the multi-zone container;
a wall coupled to and adjacent the first surface to define a gap therebetween to form a sealed volume within the second compartment, wherein:
the second compartment is configured to contain a hazard control material within the sealed volume; and
the wall defines an interior surface of the second compartment disposed proximate to an outer surface of the first compartment.

2. A multi-zone container according to claim 1, wherein the first compartment comprises a semi-rigid bladder.

3. A multi-zone container according to claim 2, further comprising an open-cell foam disposed within the semi-rigid bladder, wherein the open-cell foam is configured to cause the semi-rigid bladder to contact the wall when the semi-rigid bladder is empty.

4. A multi-zone container according to claim 2, wherein the semi-rigid bladder comprises a polyurethane covered fiber reinforced polymer.

5. A multi-zone container according to claim 2, wherein the semi-rigid bladder comprises a self-sealing elastomer.

6. A multi-zone container according to claim 1, wherein the second compartment comprises:
a first subcompartment configured to enclose a portion of the first compartment and contain an amount of the hazard control material, wherein the first subcompartment comprises:
a section of the wall; and
a portion of the sealed volume; and
a second subcompartment comprising:
a remaining section of the wall; and
a remaining portion of the sealed volume, wherein the second subcompartment is configured to:
couple to the first subcompartment;
enclose a remaining portion of the first compartment; and
contain an additional amount of the hazard control material within the remaining portion of the sealed volume.

7. A multi-zone container according to claim 1, further comprising an inlet passing between the first surface of the second compartment and an interior of the first compartment.

8. A multi-zone fuel tank system for a vehicle, comprising:
a bladder configured to contain fuel for the vehicle; and
a second compartment enclosing the bladder, wherein the second compartment comprises:
a first surface defining an exterior surface of the multi-zone fuel tank;
a wall coupled to and adjacent the first surface to define a gap therebetween to form an interior volume of the second compartment, wherein:
the second compartment is configured to contain a fire suppressant material within the interior volume; and
the wall defines an interior surface of the second compartment disposed proximate to an outer surface of the bladder.

9. A multi-zone fuel tank system according to claim 8, wherein the bladder comprises a semi-rigid material.

10. A multi-zone fuel tank system according to claim 9, wherein the semi-rigid material comprises a polyurethane covered fiber reinforced polymer.

11. A multi-zone fuel tank system according to claim 9, wherein the semi-rigid material comprises a self-sealing elastomer.

12. A multi-zone fuel tank system according to claim 9, further comprising an open-cell foam disposed within the bladder, wherein the open-cell foam is configured to substantially maintain contact between the outer surface of the bladder and the wall.

13. A multi-zone fuel tank system according to claim 8, wherein the second compartment comprises:
 a first subcompartment configured to enclose a portion of the bladder and contain an amount of the fire suppressant material, wherein the first subcompartment comprises a section of the wall; and
 a second subcompartment comprising a remaining section of the wall, wherein the second compartment is configured to:
  couple to the first subcompartment;
  enclose a remaining portion of the bladder; and
  contain an additional amount of the hazard control material.

14. A multi-zone fuel tank system according to claim 8, further comprising an inlet passing between the first surface of the second compartment and an interior of the first compartment.

15. A method of controlling a hazardous material, comprising:
 providing a first compartment configured to contain the hazardous material; and
 enclosing the first compartment within a second compartment, wherein the second compartment comprises:
  a first surface defining an exterior surface of the second compartment; and
  a wall coupled to and adjacent the first surface to define a gap therebetween to form an interior volume of the second compartment for containing a hazard control material, wherein the wall defines an interior surface of the second compartment disposed proximate to an outer surface of the first compartment; and
 releasing the hazard control material in response to a penetration of the second compartment.

16. A method according to claim 15, wherein enclosing the first compartment within a second compartment comprises:
 positioning a first subcompartment adjacent to the first compartment to enclose a portion of the first compartment, wherein the first subcompartment:
  comprises a section of the wall; and
  is configured to contain an amount of the hazard control material; and
 coupling a second subcompartment to the first subcompartment to enclose a remaining portion of the first compartment, wherein the second compartment:
  comprises a remaining section of the wall; and
  is configured to contain an additional amount of the hazard control material.

17. A method according to claim 15, further comprising placing an open-cell foam within the first compartment, wherein the open-cell foam is configured to engage the outer surface of the first compartment against the wall.

18. A method according to claim 15, wherein the first compartment comprises a semi-rigid bladder.

19. A method according to claim 15, further comprising positioning an inlet between the first surface of the second compartment and an interior of the first compartment.

* * * * *